G. GLAUDEL.
WIND DEFLECTOR.
APPLICATION FILED SEPT. 22, 1919.

1,393,682.

Patented Oct. 11, 1921.

INVENTOR.
GEORGE GLAUDEL
BY Hazard & Miller
ATTORNEYS.

UNITED STATES PATENT OFFICE.

GEORGE GLAUDEL, OF LOS ANGELES, CALIFORNIA, ASSIGNOR, BY MESNE ASSIGNMENTS, OF FIFTY PER CENT. TO GEORGE L. MITCHELL, OF SANTA MONICA, CALIFORNIA.

WIND-DEFLECTOR.

1,393,682.  Specification of Letters Patent.  Patented Oct. 11, 1921.

Application filed September 22, 1919. Serial No. 325,485.

*To all whom it may concern:*

Be it known that I, GEORGE GLAUDEL, a citizen of France, residing at Los Angeles, in the county of Los Angeles and State of California, have invented new and useful Improvements in Wind-Deflectors, of which the following is a specification.

My object is to make a wind deflector and my invention consists of the novel features herein shown, described and claimed.

Figure 1:
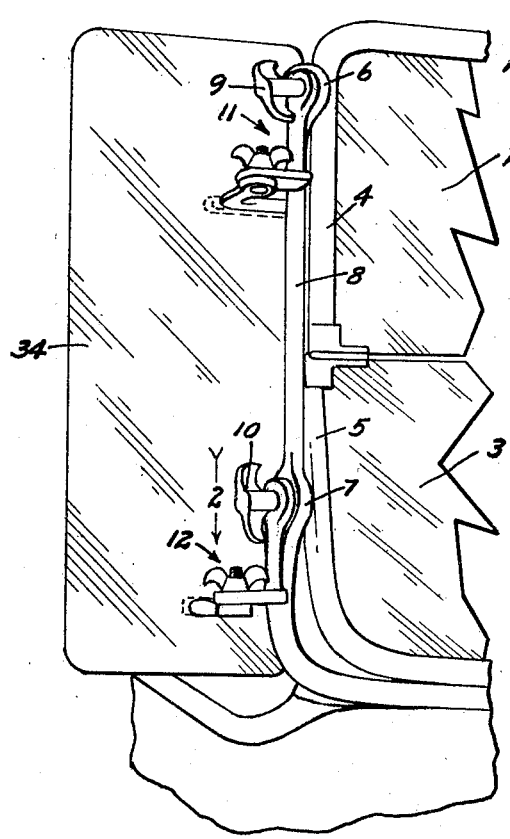
Figure 1 is a fragmentary perspective showing a wind deflector embodying the principles of my invention in use upon a main wind shield frame.

The main wind shield construction 1 has glass plates 2 and 3 provided with metal side bar frames 4 and 5, screw threaded studs extending outwardly from the side bars 4 and 5 through bearings 6 and 7 in the supporting frame 8, and wing nuts 9 and 10 are mounted upon the studs to pivotally mount the plates 2 and 3.

Figure 2:
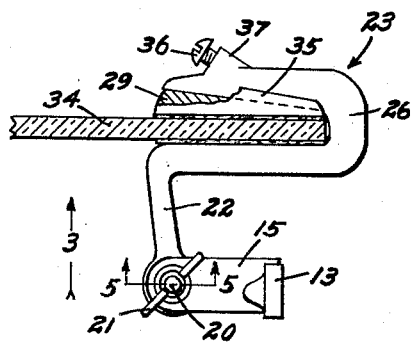
Fig. 2 is a top plan view of one of the wind deflector mountings, the wind deflector glass being broken away and shown in section, the view being taken looking in the direction indicated by the arrows 2 in Figs. 1 and 3.
Figure 3:
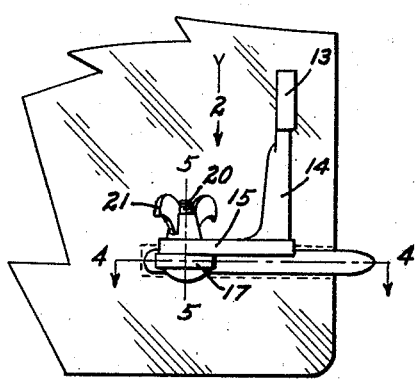
Fig. 3 is a side elevation looking in the direction indicated by the arrow 3 in Fig. 2.
Figure 4:
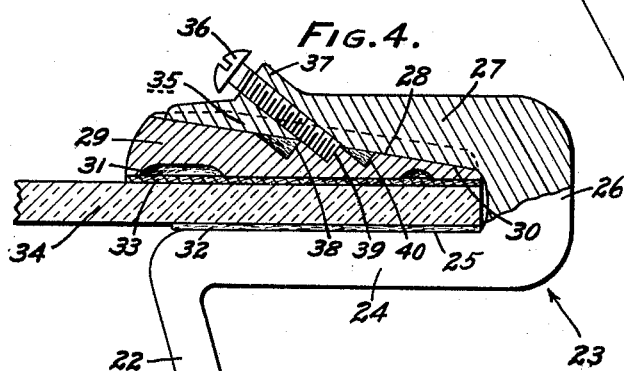
Fig. 4 is a horizontal sectional detail upon an enlarged scale on a plane parallel with Fig. 2 and on the line 4—4 of Fig. 3.
Figure 5:
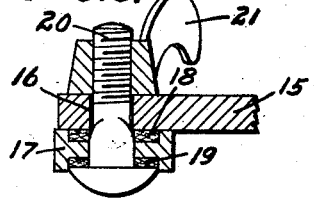
Fig. 5 is a fragmentary sectional detail on the lines 5—5 of Figs. 2 and 3.

In applying my wind deflector I remove the wing nuts 9 and 10 and apply the wind deflector mountings 11 and 12. The mountings 11 and 12 are substantially alike and the details of the mounting 12 are shown in Figs. 2, 3, 4 and 5 and are as follows: The bearing 13 fits upon the screw threaded stud against the bearing 7 and the wing nut 10 fits upon the stud against the bearing 13. The arm 14 extends straight down from the bearing 13 and the arm 15 is formed integral with the arm 14 and bearing 13 and extends laterally at right angles to the arm 14. A bolt hole 16 is formed vertically through the outer end of the arm 15. The bearing 17 has a washer 18 recessed into its upper face and a washer 19 recessed into its lower face. A clamping bolt 20 is inserted upwardly through the bearing 17 and through the bolt hole 16 and a wing nut 21 is screw seated upon the upper end of the bolt. The washers 18 and 19 are preferably non-metallic material. An arm 22 extends from the bearing 17 and a glass holding clamp 23 extends from the outer end of the arm 22.

The details of the glass holding clamp 23 are as follows: A bar 24 has a straight inner face 25, a return bend 26 extends from the opposite end of the bar 24 from the arm 22. A bar 27 extends from the opposite end of the return bend 26 from the bar 25 and has an inclined inner face 28. A gripping wedge 29 fits against the inclined inner face 28 and has a straight inner face 30 parallel with the face 25 and has recesses 31 extending from the face 30. Cushions 32 and 33 are placed against the faces 25 and 30 and the wind deflector glass 34 is inserted between the cushions.

The wedge 29 has flanges 35 between which the bar 27 operates and a clamping screw 36 is tapped through the bearing 37 and through the bar 27 at an acute angle relative to the face 30, and the inner end of the screw 36 engages shoulders 38, 39 and 40 formed in the outer face of the wedge 29 so that when the parts are in place and the screw 36 is driven inwardly against one of the shoulders, 38, 39 or 40, the wedge 29 is moved inwardly to tighten upon the glass 34 and securely hold the glass.

The mounting 11 is exactly like the mounting 12 and the bearing 13 of the mounting 11 is mounted upon the screw threaded stud of the frame 4 between the bearing 6 and the wing nut 9.

The wind deflector thus constructed may be placed on either or both sides of the main wind shield and it is simple in construction, easily applied, easily adjusted and not liable to get out of order. The mountings 11 and 12 may be readily adjusted up and down on the glass 34 and may be adjusted to and from each other to fit the various supporting side bars and the wind deflector is applied to an automobile main wind shield without clamping to the supporting side bars and without in any way covering up or disfiguring the supporting side bars.

When the parts have been properly assembled and ready to be applied to a main wind shield it is only necessary to remove the wing nuts 9 and 10, place the bearings 13 upon the studs and then replace the wing nuts 9 and 10 upon the studs against the bearings 13.

Various changes may be made without departing from the spirit of my invention as claimed.

I claim:

1. In a wind shield deflector, a glass holding clamp comprising a bar having a straight inner face, a return bend extending from one end of the bar, a second bar extending from the opposite end of the return bend from the first bar and having a straight inclined inner face in opposition to the first straight face, a gripping wedge fitting against the inclined inner face and having a straight inner face parallel with the first straight face, and a clamping screw tapped through the second bar at an acute angle to the straight face and adapted to engage the wedge so that when the glass plate is placed between the straight parallel face and the screw manipulated the wedge is operated to clamp the glass and hold it in place.

2. An automobile wind deflector comprising a deflector plate and hanger, the latter having means for attachment to a supporting part on the vehicle, and having an arm with a slotted portion to receive the edge of the deflector plate, said means including a wedge complementary to the slot, and a screw tapped through one side of the slot and adapted to engage the wedge.

3. An automobile wind deflector comprising a glass plate and a hanger, the latter having means for attachment to a supporting part on the vehicle, and having an arm with a slotted portion to receive the edge of the plate, and means on said portion to frictionally clamp the inserted plate in the slot, one wall of the slot inclined relative to the other, said means including a wedge complementary to the slot.

4. An automobile wind deflector comprising a glass plate and a hanger, the latter having means for attachment to a supporting part on the vehicle, and having an arm with a slotted portion to receive the edge of the plate, and means on said portion to frictionally clamp the inserted plate in the slot, one wall of the slot inclined relative to the other, said means including a wedge complementary to the slot and having a notched back, and a screw threaded in one wall of the slot and engageable with said back.

5. An automobile wind deflector comprising a deflector and hanger, the latter having means for attachment to a supporting part on the vehicle, and having an arm with a slotted portion to receive the edge of the deflector plate, said means including a wedge complementary to the slot, the wedge and slot having a tongue and groove connection permitting of longitudinal movement of the wedge, and a clamping screw tapped through the side of the slot at an angle to said wedge so as to engage the same and move it into wedging position when the screw is manipulated.

In testimony whereof I have signed my name to this specification.

GEORGE GLAUDEL.